United States Patent
Crall et al.

(10) Patent No.: US 6,893,225 B2
(45) Date of Patent: May 17, 2005

(54) METALLIC ARTICLE WITH INTEGRAL END BAND UNDER COMPRESSION

(75) Inventors: David William Crall, Loveland, OH (US); Peter John Linko, III, Cincinnati, OH (US)

(73) Assignee: General Electric Company, Schnectady, NY (US)

( * ) Notice: Subject to any disclaimer, the term of this patent is extended or adjusted under 35 U.S.C. 154(b) by 86 days.

(21) Appl. No.: 10/444,105

(22) Filed: May 22, 2003

(65) Prior Publication Data

US 2004/0109767 A1 Jun. 10, 2004

Related U.S. Application Data

(62) Division of application No. 09/627,143, filed on Jul. 27, 2000, now Pat. No. 6,672,838.

(51) Int. Cl.[7] ................................................ F01D 5/14
(52) U.S. Cl. ............................ 416/241 R; 416/223 A
(58) Field of Search ..................... 416/241 R, 223 A, 416/224, 225, 1; 148/903, 525

(56) References Cited

U.S. PATENT DOCUMENTS

| 4,839,245 | A |   | 6/1989  | Sue et al. |
| 5,531,570 | A | * | 7/1996  | Mannava et al. ....... 416/241 R |
| 5,591,009 | A | * | 1/1997  | Mannava et al. ....... 416/241 R |
| 5,620,307 | A |   | 4/1997  | Mannava et al. |
| 5,735,044 | A | * | 4/1998  | Ferrigno et al. ........... 29/889.1 |
| 5,756,965 | A | * | 5/1998  | Mannava ............... 219/121.85 |
| 5,826,453 | A |   | 10/1998 | Prevey, III |
| 5,846,057 | A | * | 12/1998 | Ferrigno et al. ........ 416/241 R |
| 5,932,120 | A | * | 8/1999  | Mannava et al. ...... 219/121.85 |
| 5,951,790 | A | * | 9/1999  | Mannava et al. ........... 148/510 |
| 6,005,219 | A | * | 12/1999 | Rockstroh et al. ..... 219/121.85 |

* cited by examiner

Primary Examiner—Edward K. Look
Assistant Examiner—James M. McAleenan
(74) Attorney, Agent, or Firm—William Scott Andes; Lee H. Sachs

(57) ABSTRACT

An article made of a metallic material and comprising a body and a body end portion integral with the body, includes a band of the metallic material at the end portion substantially through the entire end portion, the band being under a compressive stress greater than the body. An example of the article is a turbine engine balding member in which the body is the airfoil of the member and the band is disposed at the radially outer tip portion of the airfoil. One method for providing the band includes performing roller deformation on the end portion until a desired amount of compressive stress is developed in the band substantially through the entire end portion.

13 Claims, 1 Drawing Sheet

METALLIC ARTICLE WITH INTEGRAL END BAND UNDER COMPRESSION

This application is a divisional of Ser. No. 09/627,143, filed on Jul. 27, 2000, now U.S. Pat. No. 6,672,838, and claims benefit thereto

BACKGROUND OF THE INVENTION

This invention relates to a metallic article including an integral end or tip portion subject to damage such as cracking. More particularly, it relates to a metallic article, for example a gas turbine engine blading member made of a metallic alloy, including a tip subject to tip separation or cracking during operation and propagation of such damage from the tip into underlying material.

Power generation apparatus such as turbine engines include blading members, for example blades and vanes, having a free end portion or tip disposed in juxtaposition with another component in a relatively moving or rotating relationship. Examples of such members include a rotating compressor blade and a rotating turbine blade, having an airfoil with an airfoil tip disposed opposite a stationary shroud or seal across a relatively narrow gap. Such a gap is designed to limit leakage of a working fluid, such as air and/or products of combustion, through the gap.

As is well known and widely described in connection with the turbine engine art, such a blading member can operate at and experiences cycles including relatively high rotational speeds, sometimes cycling to high temperatures. As a result, in addition to thermal expansion and contraction of the member, local and high tensile and vibratory stresses have been generated in the tip portion of blading members. Such stresses have developed to an extent that can result in the generation of separations or cracks starting in the blade tip and propagating into the adjacent, integral body of the member. Rubbing between such relatively moving members can enhance generation of separations and cracks. Examples of such conditions have been described in the art, for example in such U.S. Pat. No. 5,620,307—Mannava et al (patented Apr. 15, 1997) and U.S. Pat. No. 5,826,453—Prevey, III (patented Oct. 27, 1998).

The Mannava et al. and the Prevey, III patents describe methods and apparatus for providing a compressive residual stress in a surface region, area or layer of the article, extending into the article from a treated surface. Mannava et al provide such region of compressive residual stress through use of a Laser Shock Peening method, extending stress into an airfoil from a laser shock peened surface. Prevey, III uses a surface burnishing operation in the form of a Low Plasticity Burnishing method. This induces compressive stress in a surface layer on the surface of members, for example to a depth of less than about 0.05" as shown by the data in the drawings, while limiting cold working to less than about 3.5%, for the reasons described by Prevey, III.

BRIEF SUMMARY OF THE INVENTION

The present invention, in one form, provides an article made of a metallic material and comprising a body and a body end portion integral with the body. The end portion comprises an integral band of the metallic material substantially through the entire end portion, the band being under a compressive stress greater than the body. One example of such an article is a blading member made of a metal alloy and comprising an airfoil having an integral airfoil tip comprising the band with the compressive stress. The band extends into and toward the airfoil to a depth selected from operational experience to be sufficient to resist operational damage.

One embodiment of the invention is a method of providing such band under compression by selecting the depth of the band into the end portion or airfoil tip, and performing roller deformation on the selected band until compressive stress is provided substantially through the entire band.

BRIEF DESCRIPTION OF THE DRAWING

The drawing is a diagrammatic perspective view of a gas turbine engine compressor blade including an airfoil with an airfoil tip band under compression according to a form of the present invention.

DETAILED DESCRIPTION OF THE INVENTION

Figure 1:
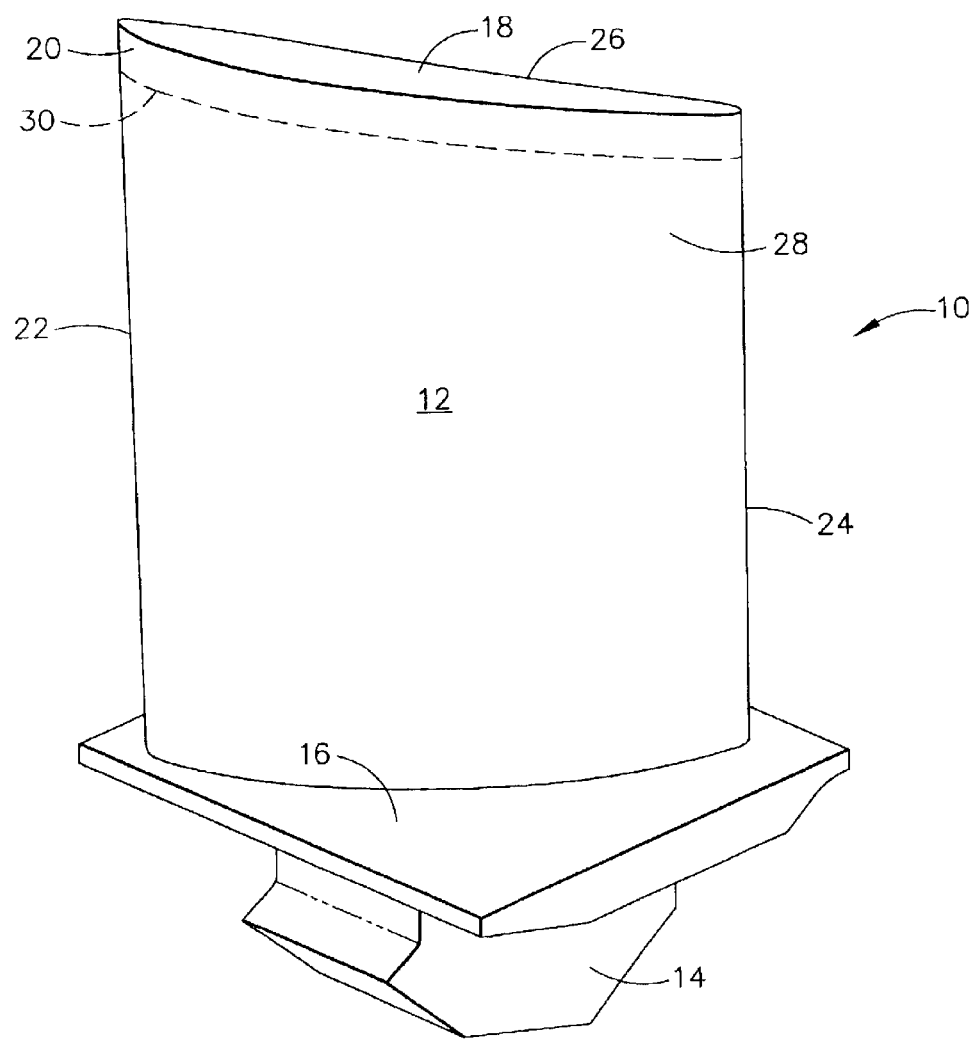

Blades in turbomachinery experience vibration that can lead to cracks and separation of surfaces of the blades. Such surfaces include the edge portions of airfoils such as the leading edge, the trailing edge, and the airfoil tip. Improving the fatigue strength of the material from which the blade is made can reduce the probability of cracks forming and propagating into the blade to failure. The radial outer tips of rotating blades are subject to the above described type of operational damage, not only from the conditions of operation but also from the potential of rubbing with opposing, cooperating components during service operation. The potential depth of such operational damage has been determined for this invention by inspecting damage to service operated blades. In some cases, the depth of such damage has extended up to about a nominal 0.1" from the tip into and toward the blade airfoil. Tip rubs can degrade the material fatigue strength in the rub-damaged region. Residual compressive stress contiguous with the area in which such damage can occur can inhibit crack initiation and/or growth.

Currently blades are made of materials that have high fatigue strength. The fatigue strength typically is enhanced using surface treating methods such as conventional shot peening, Laser Shock Peening (described in Mannava et al.) and Low Plasticity Burnishing (described in Prevey, III). In addition, an article by Prevey et al in Proceedings of the 5$^{th}$ National High Cycle Fatigue Conference (2000), and titled "FOD Resistance and Fatigue Crack Arrest in Low Plasticity Burnished IN718" includes a discussion and history of high cycle fatigue in connection with turbine engine components and various reported surface enhancement methods.

According to forms of the present invention, resistance to such damage to the end portions of articles, such as the tips of blading members, is provided by disposing a band of material substantially entirely through the cross section of the end portion or tip. The band is under a compressive stress substantially through the entire band, rather than just in a surface layer or region, in an amount greater than that of the body of the member. In this way, the present invention inhibits the initiation and propagation of cracks in the end portion or tip. For turbine engine blading members, the band extends from the airfoil tip radially into the airfoil to a depth, for example up to about a nominal 0.1", determined from inspection of a damaged service operated member to have the potential to experience operational damage. However, the band extends to a radial depth from the airfoil tip less than a location in the airfoil at which tensile stress in the airfoil, required to balance the compressive stress in the band, are so high that they are detrimental in one or more of the vibratory response modes well known in the art to be unique to each particular airfoil design. Typically, such detrimental locations are greater than about 10% of the airfoil span length from the tip, for example about 0.2" radial depth from the tip on a 2" long airfoil.

The present invention will be more fully understood by reference to the drawing. The drawing is a diagrammatic perspective view of a gas turbine engine compressor blading member, representative of a rotating compressor or a rotating turbine blade. The compressor blade shown generally at 10 includes an airfoil 12 and a base 14. In some examples, the blade generally includes a platform 16 disposed between airfoil 12 and base 14. Airfoil 12 includes an end portion or tip portion 18 integral with and radially outward of the balance or underlying body of airfoil 12. Typically, gas turbine engine blades are made of an alloy based on at least one of the elements Ti, Fe, Ni, and Co. Examples of such alloys that are commercially available include Ti 6-4 alloy, Ti 6-2-4-2 alloy, A-286 alloy, C 450 alloy, In 718 alloy, and Rene' 95 alloy.

According to an embodiment of the present invention, airfoil 12 is provided at tip 18 with a band 20 of blade alloy integral with airfoil 12 and under a residual compressive stress greater than airfoil 12 contiguous and integral with band 20. Band 20 extends substantially through the entire cross section of airfoil 12, between leading edge 22, trailing edge 24, pressure side 26 and suction side 28. In the example of a blading member having a squealer type tip, the band extends substantially through the entire cross section of the squealer tip.

It is preferred that the residual compressive stress in the band be in the range of about 10 ksi (thousands of pounds per square inch) up to the elastic limit of the material. In one example in which the alloy was In 718 Ni base alloy, the residual compressive stress in band 20 was preferred to be in the range of about 50–150 ksi. It is preferred that band 20 has a depth into airfoil 12, to a level represented by broken line 30. The band depth in each airfoil is determined from inspection of the incidence of damage in service operated airfoils, and is selected to be sufficient to resist such operational damage. In addition, as described above, the depth is selected to be less than that which requires excessive, potentially detrimental residual tensile stresses in the airfoil to balance the compressive stress in the band.

Cold work in some prior art examples of known residual compressive stresses in surface layers of articles have been limited to less than about 3.5 percent. However, the band of compressive stress according to the present invention can include cold work of up to about the elastic limit of the material without detriment to the band. For example, cold work can be included to at least about 15% for Ni base alloys, and about 10% for Ti base alloys.

In the manufacture of a blading member, the depth of the band of compressive stress provided in a manufacturing preform of the airfoil, before final finishing, generally is greater than that of the finished article. Such preform depth includes the sum of the depth to be trimmed from the blade tip during manufacture to achieve design clearance or tolerance, sometimes called the trim length, and the depth selected for the finished article to resist operational damage.

One preferred method for providing band 20 in airfoil 12 is through roller type cold working deformation of the band. One example is use of a single point pressure or cold working method traversing airfoil 12 at tip 18 and extending to a depth 30 to define band 20. Depth 30 is selected, as described above, as the extent of band 20 into airfoil 12. Then pressure is applied across the airfoil to depth 30 until a selected compressive residual stress is developed in band 20 substantially through the entire airfoil. One example of an apparatus that can be used to provide band 20 is included in the Prevey, III U.S. Pat. No. 5,826,453, identified and discussed above.

The present invention has been described in connection with specific examples and embodiments that are intended to be typical of rather than in any way limiting on the scope of the present invention. Those skilled in the arts associated with this invention will understand that it is capable of variations and modifications without departing from the scope of the appended claims.

What is claimed is:

1. A blading member made of a metallic material, the article comprising:

a body; and an outermost end portion integral with the body;

the outer most end portion comprising band of the metallic material through the entire cross section of the outermost end portion and integral with and into the body;

the entire cross section of the band being under a compressive stress greater than the body.

2. The article of claim 1 in the form of the blading member in which:

the body is an airfoil of the blading member; and, the outermost end portion is a tip portion of the airfoil.

3. The article of claim 2 in which:

the metallic material is an alloy based on at least one element selected from the group consisting of Ti, Fe, Ni, and Co;

the band extends radially into the airfoil to a depth selected from operational experience to resist operational damage.

4. The article of claim 3 in which the band extends into the airfoil to a depth less than a location at which an amount of tensile stress in the airfoil required to balance the compressive stress in the band is detrimental in at least one vibratory response mode unique to the airfoil.

5. The article of claim 4 in which the location is greater than about 10% of a span length of the airfoil.

6. The article of claim 3 in which the compressive stress is in the range of about 10 ksi up to about an elastic limit of the metallic material.

7. The article of claim 6 in which the compressive stress is in the range of about 50–150 ksi.

8. The article of claim 1 in the form of a gas turbine engine blading member comprising:

a metallic airfoil including a leading edge, a trailing edge, a pressure side, a suction side and a radially outer tip portion extending therebetween;

the tip portion comprising a radially outer band substantially through the entire tip portion, the band being under a compressive stress greater than the airfoil.

9. The blading member of claim 8 in which:

the metallic material is an alloy based on at least one element selected from the group consisting of Ti, Fe, Ni, and Co; and, the band extends into the airfoil to a depth selected from operational experience to resist operational damage.

10. The article of claim 9 in which the band extends into the airfoil to a depth less than a location at which an amount of tensile stress in the airfoil required to balance the compressive stress in the band is detrimental in at least one vibratory response mode unique to the airfoil.

11. The article of claim 10 in which the location is greater than about 10% of a span length of the airfoil.

12. The blading member of claim 10 in which the compressive stress is in the range of about 10 ksi up to about the elastic limit of the metallic material.

13. The blading member of claim 12 in which the compressive stress is in the range of about 50–150 ksi.

* * * * *

EX PARTE REEXAMINATION CERTIFICATE (7419th)

United States Patent
Crall et al.

(10) Number: US 6,893,225 C1
(45) Certificate Issued: Mar. 23, 2010

(54) METALLIC ARTICLE WITH INTEGRAL END BAND UNDER COMPRESSION

(75) Inventors: David William Crall, Loveland, OH (US); Peter John Linko, III, Cincinnati, OH (US)

(73) Assignee: General Electric Company, Schenectady, NY (US)

Reexamination Request:
No. 90/008,801, Aug. 2, 2007

Reexamination Certificate for:
Patent No.: 6,893,225
Issued: May 17, 2005
Appl. No.: 10/444,105
Filed: May 22, 2003

Related U.S. Application Data

(62) Division of application No. 09/627,143, filed on Jul. 27, 2000, now Pat. No. 6,672,838.

(51) Int. Cl.
*F01D 5/14* (2006.01)
*F01D 5/28* (2006.01)
*F01D 5/20* (2006.01)
*B23P 9/02* (2006.01)
*B23P 9/00* (2006.01)

(52) U.S. Cl. .............................. 416/241 R; 416/223 A
(58) Field of Classification Search .................. None
See application file for complete search history.

(56) References Cited

U.S. PATENT DOCUMENTS

| 4,839,245 A | 6/1989 | Sue et al. |
| 5,620,307 A | 4/1997 | Mannava et al. |
| 5,826,453 A | 10/1998 | Prevey et al. |

OTHER PUBLICATIONS

Ruschau et al., John J., "Fatigue Crack Growth Rate Characteristics of Laser Shock Peened Ti–6AI–4V," J. of Eng.and Mat. Tech.,Jul. 1, 2002, pp. 321–329, vol. 121—iss. 3, ASME,US.

*Primary Examiner*—Catherine S. Williams

(57) ABSTRACT

An article made of a metallic material and comprising a body and a body end portion integral with the body, includes a band of the metallic material at the end portion substantially through the entire end portion, the band being under a compressive stress greater than the body. An example of the article is a turbine engine balding member in which the body is the airfoil of the member and the band is disposed at the radially outer tip portion of the airfoil. One method for providing the band includes performing roller deformation on the end portion until a desired amount of compressive stress is developed in the band substantially through the entire end portion.

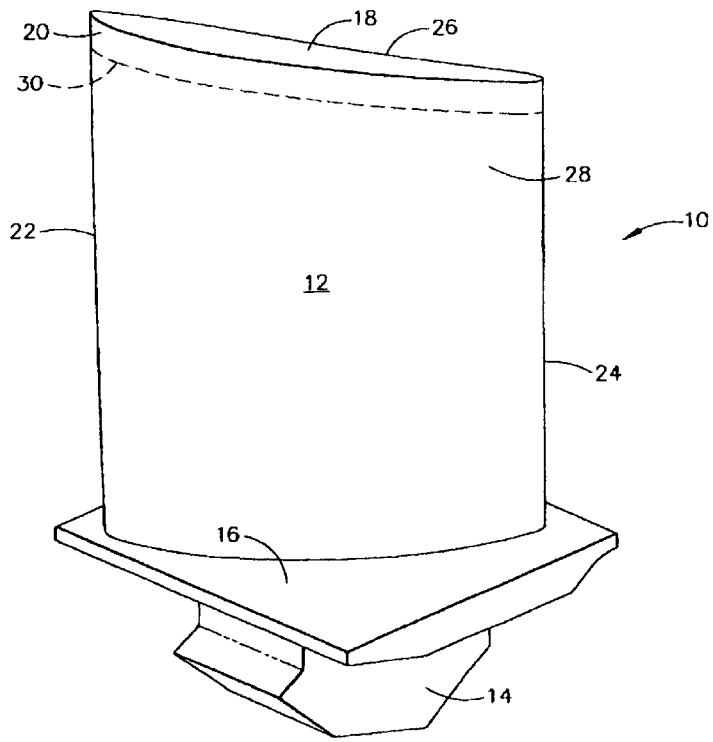

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, and 8–11 are cancelled.

Claims 1–2, 5 and 12 are determined to be patentable as amended.

Claims 3, 6–7 and 13, dependent on an amended claim, are determined to be patentable.

1. [A blading member] *An article* made of a metallic material, [the article] comprising:
   a body *which is an airfoil of a blading member*; and
   an outermost end portion integral with the body;
   the outer most end portion comprising *a* band of the metallic material through the entire cross section of the outermost end portion and integral with and into the body;
   the entire cross section of the band being under a compressive stress greater than the body*; and*
   *wherein the band extends into the airfoil to a depth less than a location at which an amount of tensile stress in the airfoil required to balance the compressive stress in the band is detrimental in at least one vibratory response mode unique to the airfoil, and wherein a level of cold work in the band is significantly greater than 3.5% and is up to about an elastic limit of the metallic material.*

2. The article of claim 1 [in the form of the blading member] in which:
   [the body is an airfoil of the blading member; and]
   the outermost end portion is a tip portion of the airfoil.

5. The article of claim [4] *1* in which the location is greater than about 10% of a span length of the airfoil.

12. The [blading member] *article* of claim [10] *1* in which the compressive stress is in the range of about 10 ksi up to about the elastic limit of the metallic material.

* * * * *